United States Patent
Wang et al.

(10) Patent No.: US 10,981,245 B2
(45) Date of Patent: Apr. 20, 2021

(54) APPARATUS FOR ULTRASONIC WELDING OF POLYMERS AND POLYMERIC COMPOSITES

(71) Applicant: GM GLOBAL TECHNOLOGY OPERATIONS LLC, Detroit, MI (US)

(72) Inventors: Pei-chung Wang, Troy, MI (US); Tae Hwa Lee, Ann Arbor, MI (US); Bradley J. Blaski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/580,289

(22) Filed: Sep. 24, 2019

(65) Prior Publication Data

US 2021/0086290 A1   Mar. 25, 2021

(51) Int. Cl.
  *B23K 20/10*  (2006.01)
  *B29C 65/08*  (2006.01)
  *B23K 101/36*  (2006.01)

(52) U.S. Cl.
  CPC ............ *B23K 20/106* (2013.01); *B29C 65/08* (2013.01); *B23K 2101/36* (2018.08)

(58) Field of Classification Search
  CPC .... B23K 1/06; B23K 20/10–106; B29C 65/08
  USPC ............ 228/1.1, 110.1; 156/73.1, 73.5, 156/580.1–580.2
  See application file for complete search history.

(56) References Cited

U.S. PATENT DOCUMENTS

| | | | | |
|---|---|---|---|---|
| 3,367,809 A | * | 2/1968 | Soloff | B29C 66/41 156/73.1 |
| 3,531,852 A | * | 10/1970 | Dominick, Jr. | H01L 21/4853 228/110.1 |
| 4,430,148 A | * | 2/1984 | Schaefer | B29C 65/086 156/553 |
| 4,767,492 A | * | 8/1988 | Fukusima | B29C 65/08 156/580.2 |
| 4,776,509 A | * | 10/1988 | Pitts | B23K 20/106 219/56.1 |
| 5,421,925 A | * | 6/1995 | Kulaszewicz | B29C 37/0078 156/73.5 |
| 5,816,472 A | * | 10/1998 | Linn | B23K 20/004 228/1.1 |
| 5,868,301 A | * | 2/1999 | Distefano | B23K 20/025 228/1.1 |
| 6,286,746 B1 | * | 9/2001 | Egan | A61B 17/0487 228/1.1 |
| 6,523,732 B1 | * | 2/2003 | Popoola | B23K 20/106 228/1.1 |
| 6,588,646 B2 | * | 7/2003 | Loprire | B23K 20/10 228/110.1 |
| 6,824,630 B2 | * | 11/2004 | Oishi | B23K 20/106 156/73.1 |

(Continued)

*Primary Examiner* — Kiley S Stoner
(74) *Attorney, Agent, or Firm* — Lorenz & Kopf, LLP

(57) ABSTRACT

Apparatus are provided for ultrasonic welding of a workpiece of one or more components. The apparatus includes a horn configured to contact the workpiece and to transmit energy to the workpiece. The horn includes a shank and a tip disposed at an end of the shank facing the workpiece. The tip has a face that has a tip radius forming a curved surface at the face. A knurl is formed on the face across the curved surface.

20 Claims, 5 Drawing Sheets

(56) References Cited

U.S. PATENT DOCUMENTS

| | | | | |
|---|---|---|---|---|
| 6,935,548 B2* | 8/2005 | Reiber | B23K 20/004 | 228/4.5 |
| 7,337,938 B2* | 3/2008 | Noro | B23K 20/106 | 156/580.1 |
| 7,407,079 B2* | 8/2008 | Copperthite | B21K 25/00 | 228/180.5 |
| 7,909,228 B2* | 3/2011 | Delsman | B23K 20/106 | 228/110.1 |
| 8,651,163 B1* | 2/2014 | Widhalm | B23K 20/106 | 156/580.2 |
| 8,820,609 B2* | 9/2014 | Walker | B23K 20/004 | 228/4.5 |
| 9,259,799 B2* | 2/2016 | Kim | B23K 1/06 | |
| 9,458,629 B2* | 10/2016 | Bauer | B29C 66/81431 | |
| 9,496,670 B2* | 11/2016 | Wagner | B06B 3/00 | |
| 9,550,252 B2* | 1/2017 | Takayashiki | H01R 4/023 | |
| 9,573,221 B2 | 2/2017 | Balogh et al. | | |
| 9,929,122 B2* | 3/2018 | Delsman | B23K 20/007 | |
| 9,981,336 B2* | 5/2018 | Poncelet | H01L 24/78 | |
| 10,744,591 B2* | 8/2020 | Miyashiro | B23K 20/106 | |
| 2002/0130159 A1* | 9/2002 | Kondo | B23K 20/10 | 228/110.1 |
| 2004/0020580 A1* | 2/2004 | Oishi | B29C 66/81433 | 156/73.1 |
| 2006/0065697 A1* | 3/2006 | Kobae | H01L 24/81 | 228/110.1 |
| 2006/0163315 A1* | 7/2006 | Delsman | B23K 20/106 | 228/1.1 |
| 2006/0180635 A1* | 8/2006 | Lim | B29C 66/80 | 228/1.1 |
| 2006/0243367 A1* | 11/2006 | Engelhart | D04H 1/555 | 156/62.6 |
| 2008/0197172 A1* | 8/2008 | Reiber | B23K 20/10 | 228/180.5 |
| 2008/0295223 A1* | 12/2008 | Tai | A42B 1/06 | 2/195.5 |
| 2010/0140325 A1* | 6/2010 | Tokutomi | B23K 20/106 | 228/110.1 |
| 2011/0166494 A1* | 7/2011 | Calvez | B29C 66/81433 | 604/8 |
| 2011/0248069 A1 | 10/2011 | Khakhalev et al. | | |
| 2012/0097339 A1* | 4/2012 | Hull | B29C 66/81433 | 156/580.1 |
| 2013/0139955 A1* | 6/2013 | Regenberg | B23K 20/106 | 156/73.1 |
| 2013/0213552 A1* | 8/2013 | Kelch | B29C 66/8242 | 156/73.1 |
| 2015/0235983 A1* | 8/2015 | Delsman | H01L 24/48 | 228/1.1 |
| 2015/0288123 A1* | 10/2015 | Wagner | H01R 4/02 | 228/110.1 |
| 2016/0076182 A1* | 3/2016 | Strube | D04H 1/45 | 28/134 |
| 2018/0369953 A1* | 12/2018 | Miyashiro | B23K 20/106 | |
| 2019/0287940 A1* | 9/2019 | Delsman | B23K 26/40 | |

\* cited by examiner

APPARATUS FOR ULTRASONIC WELDING OF POLYMERS AND POLYMERIC COMPOSITES

INTRODUCTION

The present disclosure generally relates to welding and more specifically relates to ultrasonic welding of polymers and polymeric composites using an apparatus that has a horn with optimized knurl and an optimized radius of the horn tip surface.

Welding is one of the most common forms of joining components. Ultrasonic welding is typically used to join polymeric components, especially those made of thermoplastic materials and may also be used to join metal components. In ultrasonic welding, the plastic or metal components are clamped between a welding horn and an anvil. To weld using ultrasonic energy, high-frequency vibrations are applied to the components to be joined by a high frequency vibration of the horn. The horn may also be referred to as a sonotrode, which is a broader term for a tool that creates ultrasonic vibrations that are applied to a workpiece or material such as for welding, machining or mixing. In the case of welding, component joining occurs as the result of applied mechanical force and heat generated at the interface between the components by the mechanical vibration.

Delivering consistent weld quality using ultrasonic welding requires overcoming a number of challenges. Process variables including clamp load, vibration amplitude and weld time must be set precisely and must take into consideration variations in stack height and material. With the welding of plastic, clamp forces must be kept low enough to avoid distortion of the components, while stiffer materials require higher clamp loads. If the clamp forces are too low or if misalignment occurs, insufficient weld formation may result.

Accordingly, it is desirable to provide apparatus for ultrasonic welding designed to overcome the associated challenges efficiently and effectively. Furthermore, other desirable features and characteristics of the present invention will become apparent from the subsequent detailed description and the appended claims, taken in conjunction with the accompanying drawings and the foregoing technical field and background.

SUMMARY

Apparatus are provided for ultrasonic welding of a workpiece, which may include plural components. In various embodiments, the apparatus includes a horn configured to contact the workpiece and to transmit energy to the workpiece. The horn includes a shank and a tip disposed at an end of the shank facing the workpiece. The tip has a face that has a tip radius forming a curved surface at the face. A knurl is formed on the face across the curved surface.

In additional embodiments, the knurl is defined by a knurl angle and a knurl pitch.

In additional embodiments, the shank is cylindrical in shape and the tip is shaped as a truncated spherical sector.

In additional embodiments, the tip radius defines the tip as a convex geometric structure that extends from the shank.

In additional embodiments, the horn has a horn radius along the shank. The knurl has a geometric structure that is proportional to the tip radius and to the horn radius.

In additional embodiments, the horn has a horn radius along the shank. A ratio of the tip radius to the horn radius is in a range of approximately 4 to approximately 5.

In additional embodiments, the knurl includes of a number of teeth arranged with a knurl pitch. A ratio of the knurl pitch to the horn radius is in a range of approximately 0.09 to approximately 0.13.

In additional embodiments, the knurl includes of a number of teeth. Each of the teeth has a knurl angle in a range of approximately 40 degrees to approximately 60 degrees.

In additional embodiments, the knurl angle is measured from a side of a tooth to a plane that extends across the face perpendicular to a centerline of the horn.

In additional embodiments, the workpiece includes at least one of a polymeric composite material and a polymer material.

In various other embodiments, an apparatus for ultrasonic welding of a workpiece that includes one or more components includes a horn configured to contact the workpiece and to transmit vibrational energy to the workpiece. The horn includes a shank that has a transverse dimension. A tip is disposed at an end of the shank facing the workpiece and has a face with a tip radius. The tip radius defines the tip as a convex geometric structure that extends from the shank. A knurl is formed on the face.

In additional embodiments, the shank is cylindrical in shape. The transverse dimension is a horn radius, and the tip is shaped as a truncated spherical sector.

In additional embodiments, the horn has a horn radius along the shank. The convex geometric structure is defined proportional to the tip radius and to the horn radius.

In additional embodiments, the transverse dimension is a horn radius along the shank. A ratio of the tip radius to the horn radius is in a range of approximately 4 to approximately 5.

In additional embodiments, the knurl includes of a number of teeth arranged with a knurl pitch. A ratio of the knurl pitch to the horn radius is in a range of approximately 0.09 to approximately 0.13.

In additional embodiments, the knurl includes a number of teeth. Each of the teeth has a knurl angle in a range of approximately 40 degrees to approximately 60 degrees.

In additional embodiments, the knurl angle is measured from a side of a tooth to a plane that extends across the face perpendicular to a centerline of the horn.

In additional embodiments, the shank has a horn radius (R), the face has a tip radius (r), the knurl has a knurl pitch (d), the horn is defined by r/R=4-5 and d/R=0.09-0.13, and the knurl has a knurl angle of 40-60 degrees.

In additional embodiments, the transverse dimension is a horn radius along the shank. A ratio of the tip radius to the horn radius is in a range of approximately 4 to approximately 5. The knurl includes a number of teeth arranged with a knurl pitch. A ratio of the knurl pitch to the horn radius is in a range of approximately 0.09 to approximately 0.13. Each of the teeth has a knurl angle of approximately 40 degrees to approximately 60 degrees.

In various other embodiments, an apparatus for ultrasonic welding of a workpiece of one or more components includes a horn configured to contact the workpiece and to transmit energy to the workpiece. The horn includes a shank with a tip disposed at an end of the shank facing the workpiece. The tip has a face with a knurl. The shank has a horn radius (R), the face has a tip radius (r), the knurl has a knurl pitch (d), the horn is defined by r/R=4-5 and d/R=0.09-0.13, and the knurl has a knurl angle of 40-60 degrees.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, ultrasonic welding is accomplished with welding horns of an optimal design. It has been discovered that ultrasonic welding of relative stiff plastic for structural applications such as certain polymers and polymeric composites including carbon fiber reinforced polyamide 6 and others, represents unique challenges. As described in the current disclosure, the welding horn's design is optimized to avoid results such as skidding and to consistently produce favorable weld size and strength. In a number of embodiments as described herein, the welding horn may include a knurled tip where the individual knurl elements have optimal pitch height and angle to produce desirable weld effects. In addition, unlike convention flat tipped horns, the welding horns disclosed herein may have a tip curvature that is optimized for desirable weld formation.

Figure 1:
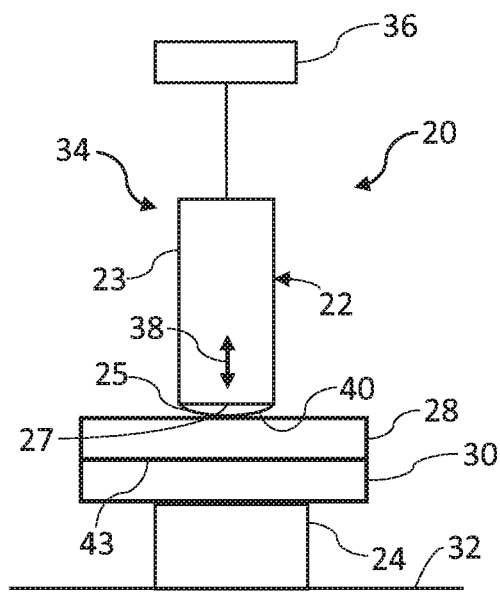
FIG. 1 is a schematic illustration of an ultrasonic welding apparatus, in accordance with various embodiments.
Figure 2:
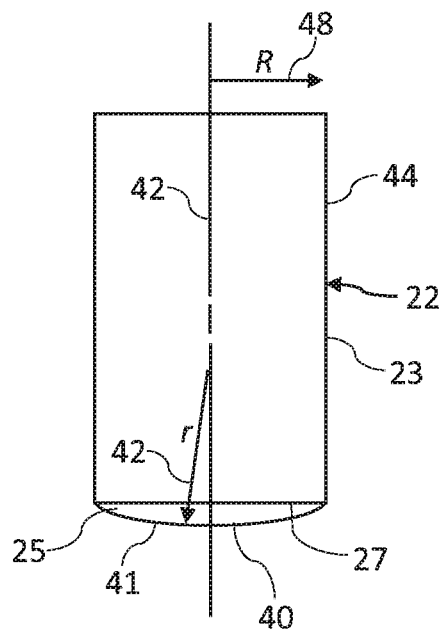
FIG. 2 is a schematic illustration of the welding horn of the apparatus of FIG. 1, in accordance with various embodiments.

Referring to FIGS. 1 and 2, a welding apparatus 20 of an ultrasonic type is illustrated. The apparatus 20 includes a horn 22 and an anvil 24 between which a workpiece 26 comprising one or more components is clamped. In this example the workpiece 26 includes two components 28, 30 to be welded together. In other embodiments, fewer or more workpieces may be included. The anvil is backed by a fixture 32 to prevent the movement. The apparatus 20 includes an ultrasonic stack 34 that includes the horn 22 along with a converter/booster 36. The converter/booster 36 converts an electrical signal into a mechanical vibration 38 and produces the amplitude of the vibration 38. The horn 22 applies the vibration 38 to the components 28, 30. The vibration frequency is generally in the range of 20-40 kilohertz. The motion of the vibration 38 at the horn face 40 is transferred to the two components 28, 30. The vibration 38 moves through the component 28 and creates friction and viscoelastic deformation at the interface 43 between the components 28, 30. As a result, heat is created at the interface 43 which melts the material, which when cooled forms a weld fusing the components 28, 30 together.

Generally, the horn 22 has a shank 23 and a tip 25 at an end 27 of the shank 23 that faces the workpiece 26. In the current embodiment, the horn 22 has a face 40 that is rounded at the tip 25 forming a convex geometric structure, which results in the clamping force and the vibration 38 being applied to the components 28, 30 over a smaller area than a flat horn tip. The resulting higher force to area ratio has been found beneficial in welding stiffer materials. The face 40 has a tip radius (r) 42, and is generally shaped as a truncated sector of a sphere. The tip radius 42 creates a curvature so that the face 40 is convex in nature and is thicker at the horn centerline 46 as compared to its outer edges, with the face 40 comprising a curved surface 41. The tip radius 42 accommodates misalignments such as slight deviations from perpendicular between the horn 22 and the component 28. The body 44 of the horn 22 is generally cylindrical in shape at its shank 23 and is formed around a centerline 46 with a horn radius (R) 48 that is a transverse dimension at the shank 23 of the horn 22. The radius 48 is continuous along the shank 23, at least at the segment adjacent the tip 25, and defines the shank 23 as a solid cylinder centered on the centerline 46. The radius 48 of the horn 22 determines the general outer perimetral size of the face 40 and the tip radius 42 may vary as further described below.

Figure 3:
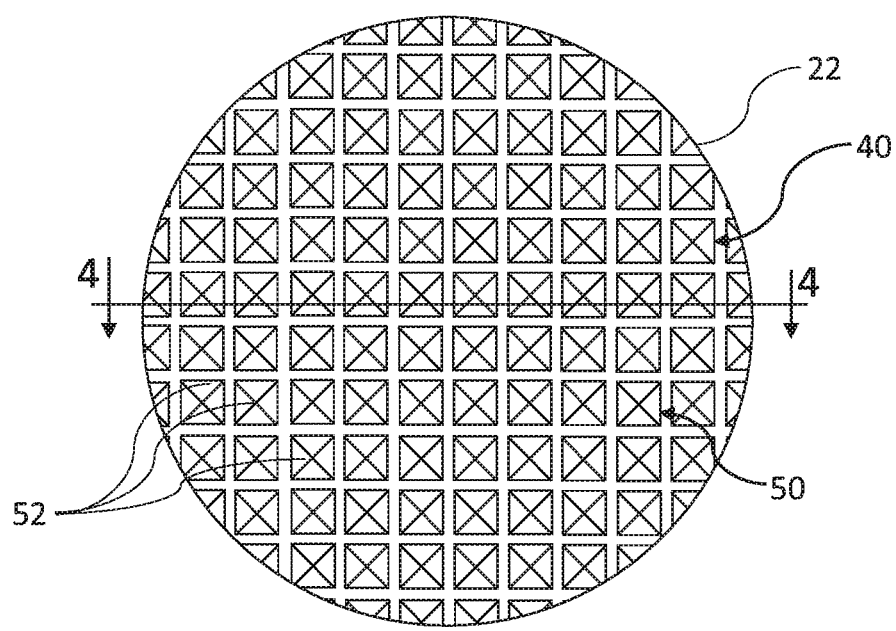
FIG. 3 is an end view illustration of the face of the welding horn of FIG. 2, in accordance with various embodiments.
Figure 4:
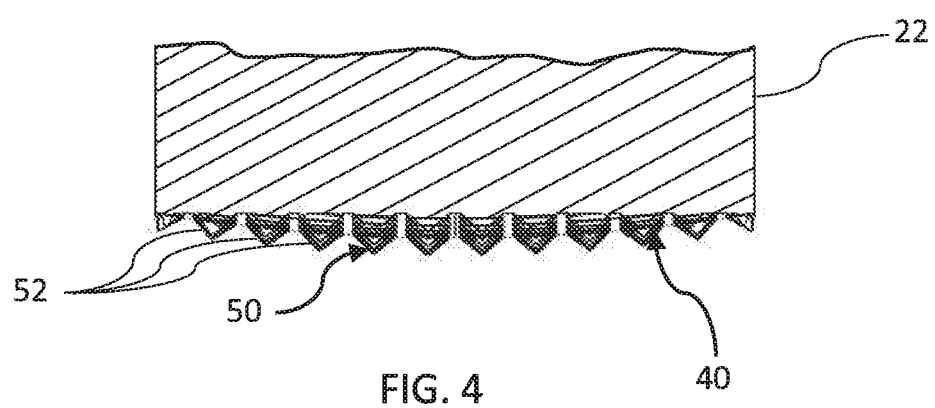
FIG. 4 is a fragmentary, sectional view taken generally through the line 4-4 of FIG. 3, in accordance with various embodiments.

Details of the face 40 of the horn 22 are shown in FIGS. 3 and 4. The face 40 includes knurl 50 formed of a number of knurl elements as uniformly distributed individual teeth 52. In the current embodiment, the knurl 50 is formed in a diamond pattern on the face 40 with rows and columns of teeth 52 separated by grooves. In other embodiments, rather than a diamond pattern, the knurl 50 may be formed in a pattern that is diagonal, straight, annular, a combination thereof, or in another pattern. The teeth 52 each project outward from the face 40 and are each formed in a pyramid shape, and specifically in this example as a four-sided pyramid. In other embodiments, the teeth 52 may be formed in other shapes such as three-sided, conical, or another shape.

Figure 5:
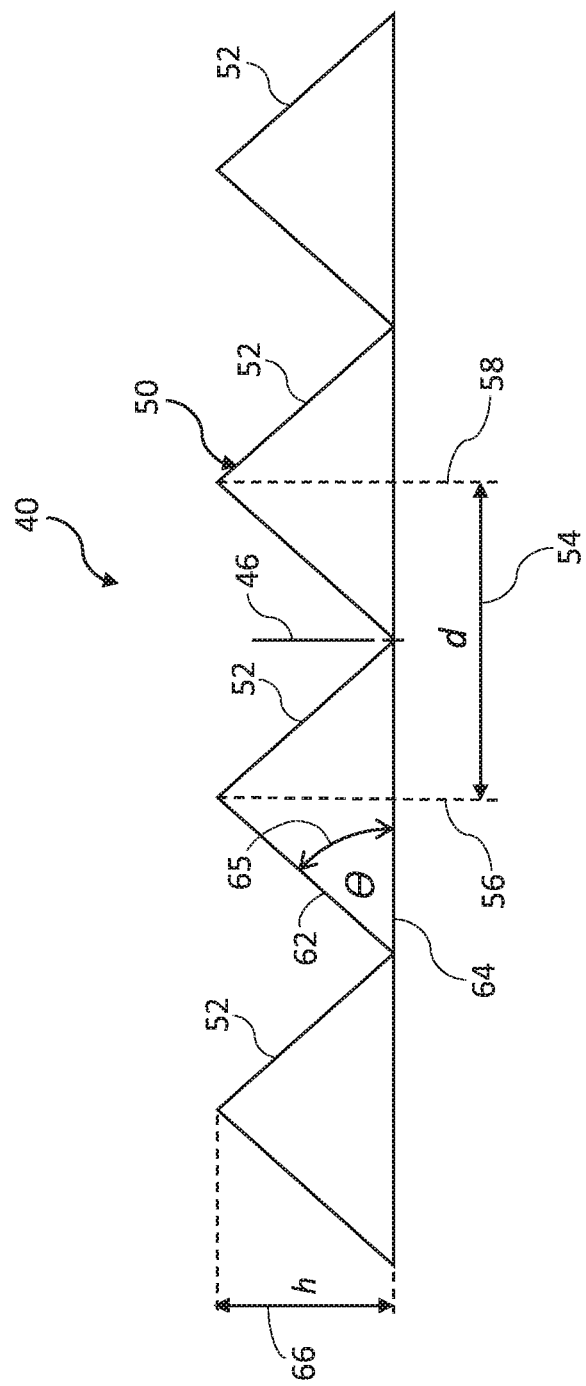
FIG. 5 is a schematic illustration of knurl of the welding face of FIG. 3, in accordance with various embodiments.

A number of the teeth 52 are schematically shown in FIG. 5. The teeth 52 are separated from one another by a uniform knurl pitch (d) 54 in each direction along a row or column of the knurl 50. The knurl pitch 54 is the distance from the center 56 of one tooth 52 to the center 58 of an adjacent tooth 52. Each tooth 52 also has a knurl angle ($\theta$) 65. The knurl angle 65 is the angle between each side 62 of a tooth 52 and a plane 64 that extends across the face 40 perpendicular to the centerline 46 of the horn 22. The knurl pitch 54 and the knurl angle 65 determine the size of the teeth 52, including the height (h) 66.

It has been found that the design variables of the horn 22 including the geometry of the knurl 50 and the tip radius 42 influence welding performance. It has been discovered that reducing horn skid with certain optimized horn geometry results in improved weld quality. An experimental analysis has been carried out including investigating welding performance of three geometry options of the horn 22 in ultrasonic welding of polymeric composites with a stack of two workpieces, each with a thickness of 3 millimeters. Table 1 shows the specifications of the three geometry options A, B and C.

TABLE 1

| Option | Tip radius 42 (millimeters) | Knurl Angle 65 (degrees) | Knurl Pitch 54 (millimeters) |
|---|---|---|---|
| A | 32.74 | 30 | 0.75 |
| B | 36.69 | 45 | 1.00 |
| C | 40.64 | 60 | 1.25 |

Figure 6:
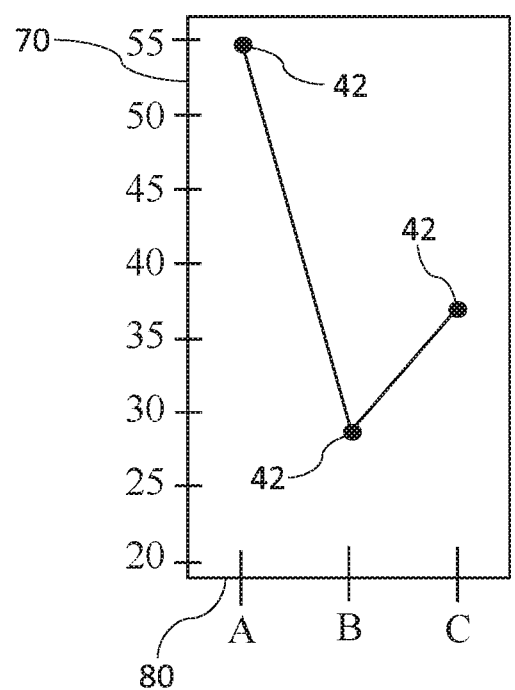
FIG. 6 is a graphical representation of weld area on the vertical axis versus various tip radius options on the horizontal axis.
Figure 7:
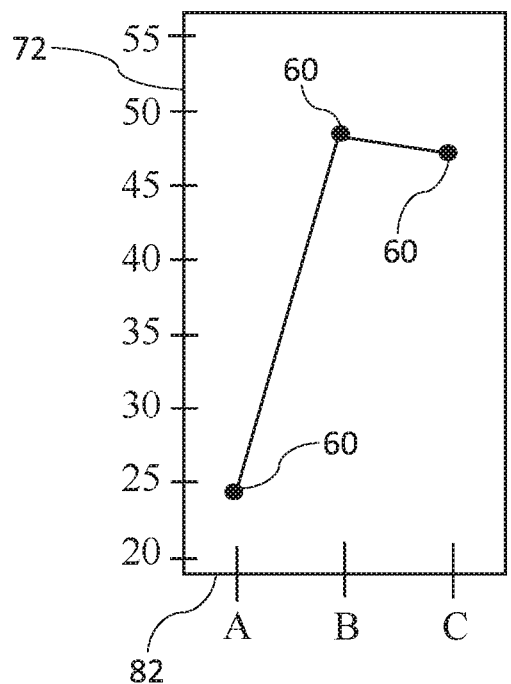
FIG. 7 is a graphical representation of weld area on the vertical axis versus various knurl angle options on the horizontal axis.
Figure 8:
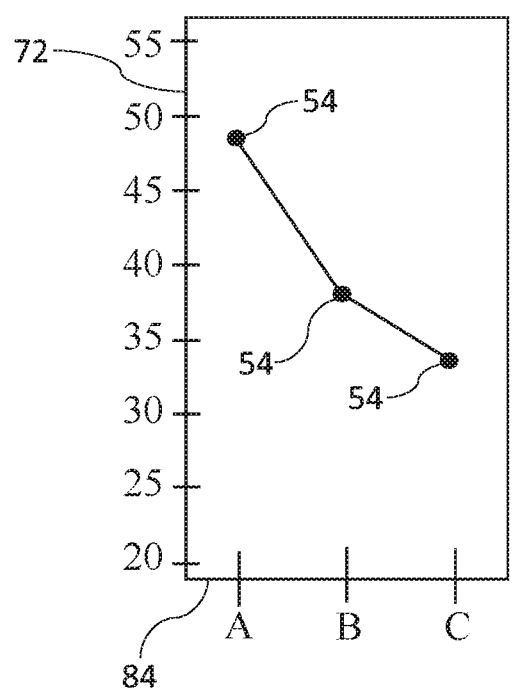
FIG. 8 is a graphical representation of weld area on the vertical axis versus various knurl pitch options on the horizontal axis.

The results of experimental analysis of the welds formed by the horn 22 according to options A, B and C under a trigger force of 250 Newtons, a horn velocity of 0.25 millimeters/second and an amplitude range of 100 micrometers (i.e., ±50 μm), are shown in FIGS. 6-8. Specifically, the size of the weld area that is developed at a specific weld time are shown with variations in tip radius 42, knurl angle 65 and knurl pitch 54 according to the options A, B and C. FIGS. 6-8 show, at 0.6 seconds of weld time, weld area in square millimeters on the vertical axes 70, 72, 74 versus the specifications of options A, B and C on the horizontal axes 80, 82, 84 for each of the tip radius 42 in FIG. 6, the knurl angle 65 in FIG. 7 and the knurl pitch 54 in FIG. 8.

With regard to tip radius 42 of the horn 22, as shown in FIG. 6, option A results in approximately 55 square millimeters of weld area, option B results in approximately 28 square millimeters of weld area, and option C results in approximately 37 square millimeters of weld area. These results demonstrate that with regard to tip radius 42 at 0.6 seconds of weld time, option A results in the preferred largest weld area. FIG. 7 shows that with regard to knurl angle 65 of the horn 22, option A results in results in approximately 24 square millimeters of weld area, option B results in approximately 48 square millimeters of weld area, and option C results in approximately 47 square millimeters of weld area. These results demonstrate that with regard to knurl angle 65 at 0.6 seconds of weld time, option B results in the preferred largest weld area. FIG. 8 shows that with regard to knurl pitch 54 of the horn 22, option A results in results in approximately 48 square millimeters of weld area, option B results in approximately 38 square millimeters of weld area and option C results in approximately 34 square millimeters of weld area. These results demonstrate that with regard to knurl pitch 54 at 0.6 seconds of weld time, option A results in the preferred largest weld area.

Additional experimentation has been conducted at various weld times including at 0.7 seconds, 0.8 seconds and 0.9 seconds. In each case it has been determined that tip radius 42 option A produces the largest weld area, knurl angle 65 option B produces the largest wed area, and knurl pitch 54 option A produces the largest weld area. In other words, the smallest evaluated tip radius 42, the medium sized evaluated knurl angle 65, and the smallest evaluated knurl pitch 54, produced the best results. Accordingly an optimized horn 22 has a tip radius 42 of approximately 32.74 millimeters, has an optimized knurl angle 65 of approximately 45 degrees and has an optimized knurl pitch 54 of approximately 0.75 millimeters. It is also demonstrated that a larger tip radius 42 produces significantly smaller weld area, a knurl angle 65 of 60 degrees produces results that are approximately as good as a knurl angle of 45 degrees, and a larger knurl pitch 54 distance produces significantly less weld area as compared to the knurl pitch 54 of option A.

It has also been discovered that the size of the horn 22 influences the optimal values of tip radius 42 and knurl pitch 54. Accordingly, the optimal tip radius 42 and the optimal knurl pitch 54 may be related to size of the horn 22, and in particular to the horn radius 48. The experimental results may be extrapolated to define the horn 22 in terms of angles and ratios. As shown above, an optimal horn 22 has a knurl angle of approximately 40-60 degrees. Additionally, using a horn radius 48 of 7 millimeters, a ratio (r/R) of tip radius 42 to horn radius 48 may be defined by an optimal range of 4.0 to 5.0, and by a preferred ratio of 4.66. Also, a ratio (d/R) of knurl pitch 54 to horn radius 48 may be defined by an optimal range of 0.09 to 0.13, and by a preferred ratio of 0.11. Accordingly, it has been discovered that an optimized horn 22 has a knurl angle 65 of 40-60 degrees, a tip radius 42 to horn radius 48 ratio of 4.0-5.0 and a knurl pitch 54 to horn radius 48 ratio of 0.09-0.13. The ratio knurl pitch 54 to horn radius 48 (d/R), and the tip radius 42 determine the number of knurl teeth 52 on the face 40. It has been found that an optimized horn 22 produces a larger weld area, in-part due to reduced skidding and optimal energy transmission to the workpiece interface 43.

Accordingly, apparatus for ultrasonic welding includes optimized geometry to produce desirable weld characteristics. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An apparatus for ultrasonic welding of a workpiece of one or more components, the apparatus comprising:
a horn configured to contact the workpiece and to transmit energy to the workpiece, the horn comprising:
a shank, wherein the shank is cylindrical in shape;
a tip disposed at an end of the shank facing the workpiece, the tip having a face that has a tip radius so that the tip has a curved surface at the face, wherein the tip is shaped as a truncated spherical sector; and
a knurl on the face across the curved surface.

2. The apparatus of claim 1, wherein the knurl is defined by a knurl angle and a knurl pitch.

3. The apparatus of claim 1, wherein:
the shank has a horn radius (R);
the face has a tip radius (r);
the knurl has a knurl pitch (d);
the horn is defined by r/R=4-5 and d/R=0.09-0.13; and
the knurl has a knurl angle of 40-60 degrees.

4. The apparatus of claim 1, wherein the tip radius defines the tip as a convex geometric structure that extends from the shank.

5. The apparatus of claim 1, wherein:
the horn has a horn radius along the shank, and
wherein the knurl has a geometric structure proportional to the tip radius and to the horn radius.

6. The apparatus of claim 1, wherein the horn has a horn radius along the shank, wherein a ratio of the tip radius to the horn radius is in a range of approximately 4 to approximately 5.

7. The apparatus of claim 1, wherein the knurl comprises of a number of teeth arranged with a knurl pitch, wherein a ratio of the knurl pitch to the horn radius is in a range of approximately 0.09 to approximately 0.13.

8. The apparatus of claim 1, wherein:
the knurl comprises of a number of teeth; and
each of the teeth has a knurl angle in a range of approximately 40 degrees to approximately 60 degrees.

9. The apparatus of claim 8, wherein the knurl angle is measured from a side of a tooth to a plane that extends across the face perpendicular to a centerline of the horn.

10. The apparatus of claim 1, wherein the workpiece comprises at least one of a polymeric composite material and a polymer material.

11. An apparatus for ultrasonic welding of a workpiece of one or more components, the apparatus comprising:
a horn configured to contact the workpiece and to transmit vibrational energy to the workpiece, the horn comprising:
a shank that has a transverse dimension;
a tip disposed at an end of the shank facing the workpiece, the tip having a face that has a tip radius, wherein the tip radius defines the tip as a convex geometric structure that extends from the shank; and
a knurl on the face,
wherein the transverse dimension comprises a horn radius along the shank, wherein a ratio of the tip radius to the horn radius is in a range of approximately 4 to approximately 5.

12. The apparatus of claim 11, wherein the shank is cylindrical in shape, wherein the tip is shaped as a truncated spherical sector.

13. The apparatus of claim 11, wherein:
the horn has a horn radius along the shank, and
wherein the convex geometric structure is defined proportional to the tip radius and to the horn radius.

14. The apparatus of claim 11, wherein the tip radius and the knurl pitch are both optimized in size in relation to the horn radius.

15. The apparatus of claim 11, wherein the knurl is comprised of a number of teeth arranged with a knurl pitch, wherein a ratio of the knurl pitch to the horn radius is in a range of approximately 0.09 to approximately 0.13.

16. The apparatus of claim 11, wherein:
the knurl is comprised of a number of teeth; and
each of the teeth has a knurl angle in a range of approximately 40 degrees to approximately 60 degrees.

17. The apparatus of claim 16, wherein the knurl angle is measured from a side of a tooth to a plane that extends across the face perpendicular to a centerline of the horn.

18. The apparatus of claim 11, wherein:
the shank has a horn radius (R);
the face has a tip radius (r);
the knurl has a knurl pitch (d);
the horn is defined by r/R=4-5 and d/R=0.09-0.13; and
the knurl has a knurl angle of 40-60 degrees.

19. The apparatus of claim 11, wherein:
the transverse dimension comprises a horn radius along the shank, wherein a ratio of the tip radius to the horn radius is in a range of approximately 4 to approximately 5;
the knurl comprises a number of teeth arranged with a knurl pitch, wherein a ratio of the knurl pitch to the horn radius is in a range of approximately 0.09 to approximately 0.13; and
each of the teeth has a knurl angle of approximately 40 degrees to approximately 60 degrees.

20. An apparatus for ultrasonic welding of a workpiece of one or more components, the apparatus comprising:
a horn configured to contact the workpiece and to transmit energy to the workpiece, the horn comprising:
a shank;
a tip disposed at an end of the shank facing the workpiece, the tip having a face; and
a knurl on the face, wherein:
the shank has a horn radius (R);
the face has a tip radius (r);
the knurl has a knurl pitch (d);
the horn is defined by r/R=4-5 and d/R=0.09-0.13; and
the knurl has a knurl angle of 40-60 degrees.

* * * * *